T. E. MURRAY.
METAL VEHICLE WHEEL.
APPLICATION FILED FEB. 18, 1916.

1,220,768.

Patented Mar. 27, 1917.

Inventor
Thomas E. Murray
By
His Attorney.

UNITED STATES PATENT OFFICE.

THOMAS E. MURRAY, OF NEW YORK, N. Y.

METAL VEHICLE-WHEEL.

1,220,768. Specification of Letters Patent. Patented Mar. 27, 1917.

Application filed February 18, 1916. Serial No. 79,048.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to metal vehicle wheels, and consists in the construction of the tubular spokes and the means for locking the same together, as more particularly hereinafter set forth.

In the accompanying drawings—

Figure 1:
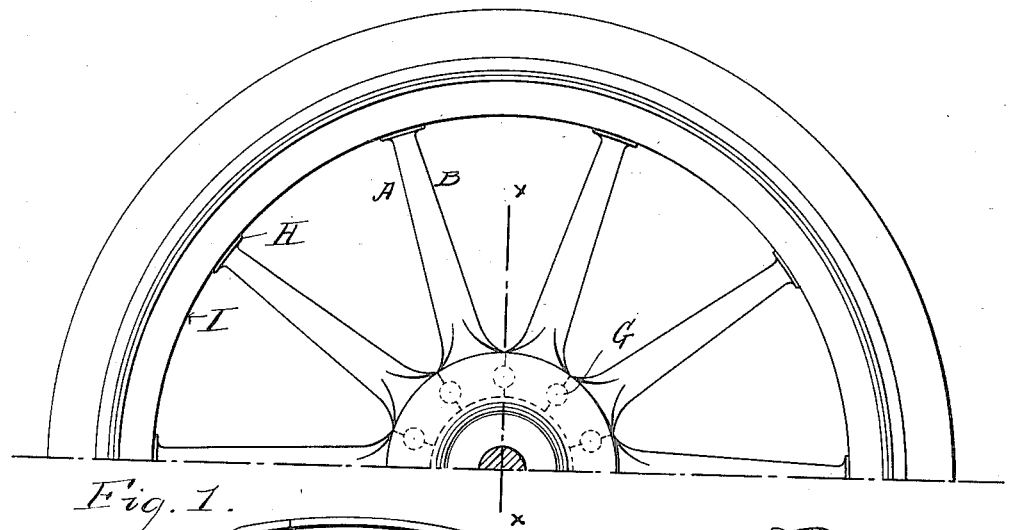
Figure 2:
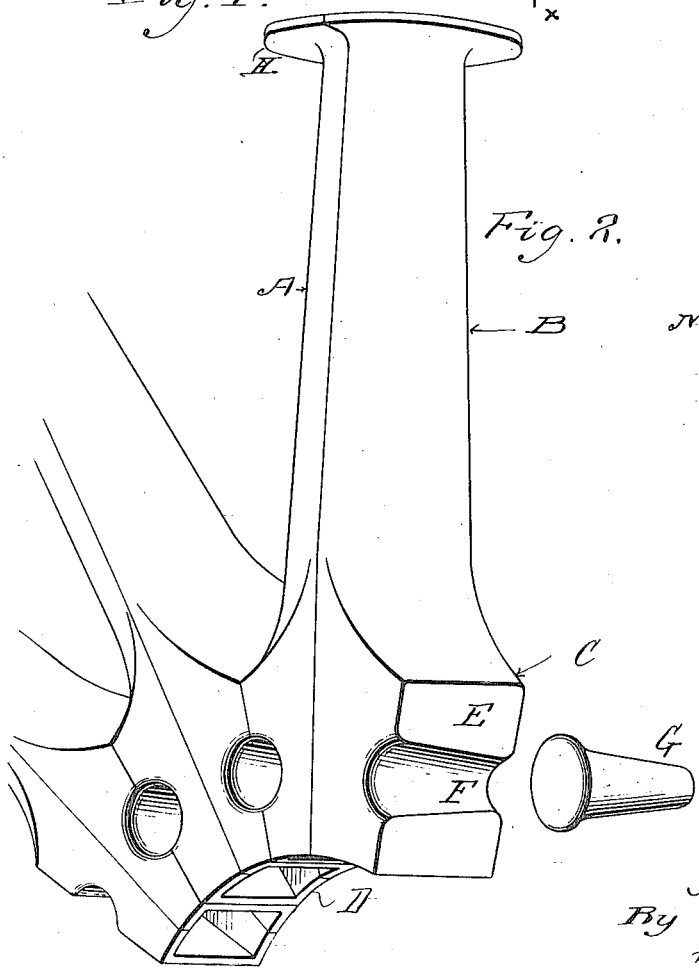
Figure 3:
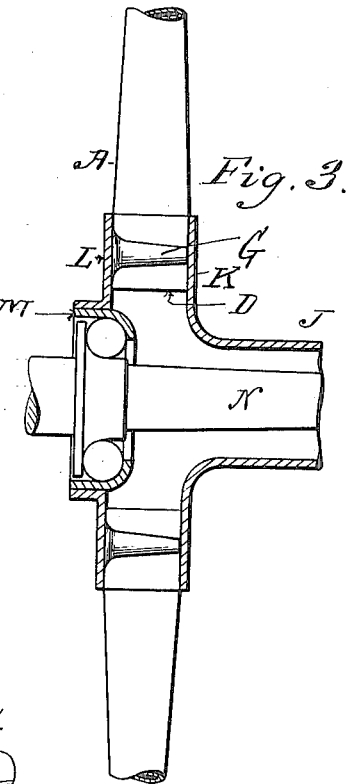

Figure 1 is an elevation of one-half of my wheel. Fig. 2 is a perspective view of one spoke and portions of two others adjacent thereto, and of one of the pins G. Fig. 3 is a diametral section of my wheel on the line $x$, $x$ of Fig. 1.

Similar letters of reference indicate like parts.

Each tubular spoke is made of sheet metal in two half sections A, B, which register at their edges and are united by welding. Each spoke is enlarged at its inner end portion, as shown at C, so as to take the shape of an inverted wedge frustum, the extremity D being an arc. The sides E are in planes radial to the central axis of the wheel, so that when the several spokes are placed with said sides in contact, said frusto-wedge shaped portions form a nave. In each side E is a tapered recess F, formed by striking up the metal. When the recesses F of two adjacent spokes come together they form a tube in which is seated a correspondingly shaped headed pin G. After the spokes are assembled, as described, the pins G are preferably tightly driven into the said tubes, thus locking the spokes together. On the outer end of each spoke is a flange H, which is preferably welded to the inner surface of the rim I.

In securing the spokes to the hub J, one face of the spoke enlargements bears against the hub flange K, and against the other face is placed the flange L of a collar which is received upon the casing M of the ball-bearing runway supported upon the axle N in the usual way. The flange K and the flange of collar L may be welded to the spoke faces, and the collar flange L may be welded to the runway casing M so that said flanges centrally support the nave, as shown in Fig. 3. The recesses F may be flared at their larger ends to receive the heads of the pins G, which thus come flush with the spoke face. The hub flange K and collar flange L thus prevent the pin from escaping.

I claim:

A metal vehicle wheel, comprising a plurality of hollow spokes having frusto-wedge-shaped enlargements at their inner ends, the inclined sides of said enlargements being placed in juxtaposition to form a nave, and the inclined sides of each spoke having a transverse recess registering with similar recesses in the inclined sides of the adjacent spokes to form tubes extending through said nave, pins wholly received in said tubes, a hub, and annular flanges on said hub welded to opposite faces of said nave, covering said tubes and centrally supporting said nave.

In testimony whereof I have affixed my signature in presence of two witnesses.

THOMAS E. MURRAY.

Witnesses:
GERTRUDE T. PORTER,
MAY G. McGARRY.